United States Patent
Negro et al.

(10) Patent No.: US 10,110,829 B2
(45) Date of Patent: Oct. 23, 2018

(54) SYSTEM AND METHOD FOR DETERMINATION AND ADJUSTMENT OF CAMERA PARAMETERS USING MULTI-GAIN IMAGES

(71) Applicant: Cognex Corporation, Natick, MA (US)

(72) Inventors: James A. Negro, Arlington, MA (US); Earle B. Stokes, Westford, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/230,342

(22) Filed: Aug. 5, 2016

(65) Prior Publication Data

US 2017/0214860 A1 Jul. 27, 2017

Related U.S. Application Data

(63) Continuation of application No. 13/794,618, filed on Mar. 11, 2013, now Pat. No. 9,413,981.

(60) Provisional application No. 61/716,370, filed on Oct. 19, 2012.

(51) Int. Cl.
*H04N 5/243* (2006.01)
*G06K 7/10* (2006.01)
*G06K 7/14* (2006.01)

(52) U.S. Cl.
CPC ......... *H04N 5/243* (2013.01); *G06K 7/10722* (2013.01); *G06K 7/1478* (2013.01)

(58) Field of Classification Search
CPC .................................................. H04N 5/243

USPC ............................ 235/380, 381, 243; 705/41
See application file for complete search history.

(56) References Cited

U.S. PATENT DOCUMENTS

| | | |
|---|---|---|
| 6,593,562 B1 | 7/2003 | Parrish et al. |
| 2007/0075772 A1 | 4/2007 | Kokubo et al. |
| 2007/0284448 A1 | 12/2007 | Wang |
| 2011/0013002 A1 | 1/2011 | Thompson et al. |
| 2011/0038563 A1 | 2/2011 | Bremer |
| 2012/0182411 A1 | 7/2012 | Nakatsuka et al. |
| 2013/0093916 A1 | 4/2013 | Bai et al. |
| 2013/0169644 A1 | 7/2013 | Bolton |
| 2013/0181055 A1 | 7/2013 | Liu et al. |

FOREIGN PATENT DOCUMENTS

| | | |
|---|---|---|
| AT | 412317 B | 12/2004 |
| EP | 2284766 B1 | 7/2012 |
| WO | 2007134473 A1 | 11/2007 |

*Primary Examiner* — Allyson Trail
(74) *Attorney, Agent, or Firm* — Loginov IP

(57) ABSTRACT

This invention provides a system and method for auto-regulation of parameters a vision system camera and/or associated illumination of objects imaged by the camera using a plurality of differentiated gain (multi-gain) settings on the camera's image sensor to determine the gain value producing the most-readable image. The image (having the best characteristics) acquired using multiple gain settings can be read for information as a discrete gain image and/or the camera parameters (e.g. global gain and/or global exposure time) can be uniformly set across the pixel array to the best values for acquisition of a subsequent, higher sampled image. This image is then read (e.g. decoded) for information contained within any identified features of interest (e.g. found IDs).

17 Claims, 7 Drawing Sheets

SYSTEM AND METHOD FOR DETERMINATION AND ADJUSTMENT OF CAMERA PARAMETERS USING MULTI-GAIN IMAGES

RELATED APPLICATIONS

This application is a continuation of co-pending U.S. patent application Ser. No. 13/794,618, filed Mar. 11, 2013, entitled SYSTEM AND METHOD FOR DETERMINATION AND ADJUSTMENT OF CAMERA PARAMETERS USING MULTI-GAIN IMAGES, which application claims the benefit of U.S. Provisional Application Ser. No. 61/716,370, filed Oct. 19, 2012, entitled SYSTEM AND METHOD FOR DETERMINATION AND ADJUSTMENT OF CAMERA PARAMETERS USING MULTI-GAIN IMAGES, the entire disclosures of each of which applications are herein incorporated by reference.

FIELD OF THE INVENTION

This invention relates to the control of parameters in vision system cameras, and more particularly to auto-regulation of such parameters.

BACKGROUND OF THE INVENTION

Vision systems that perform measurement, inspection, alignment of objects and/or decoding of symbology codes or marks (e.g. one-dimensional (1D) and two-dimensional (2D) datamatrix bar codes, DotCodes, etc.—also termed "IDs") are used in a wide range of applications and industries. These systems are based around the use of an image sensor (also termed an "imager"), which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes, 2D codes or other ID types. The image is processed to identify code features, which are then decoded by a decoding process and/or processor obtain the inherent data represented by the code.

A commonly used ID reader is the handheld type, that a user directs at an object or scene containing an ID, and then pull a trigger (typically a button on the handle) to acquire and decode the code. Often, a successful reading/decoding of the code is followed by a visual and/or audible alert—such as a green light and/or a beep. Handheld ID readers can include one or more types of "internal" illumination—that is, illumination that is projected from the housing of the reader itself. Such illumination can be provided in a variety of colors, diffusivity, and/or angles with respect to the scene. More generally, the relative angle at which an ID is imaged, the ambient light conditions and nature of the ID can all vary substantially. For example, IDs can be printed on an object as a high-contrast pattern or a low-contrast pattern, or formed on an object as a non-printed, peened/engraved pattern. The reader should accommodate all these variations and make appropriate adjustment to its parameters, such as pixel gain, brightness exposure and/or illumination type and/or intensity so as to provide an optimal image for decoding.

Prior art systems have attempted to optimize reader performance in a variety of manners. For example, some systems acquire a stream of images, each at different camera parameter settings, and analyze the images to determine the quality of features in the image. One or more of the images is decoded. Other systems attempt to acquire pre-triggered images of the scene in an effort to determine prevailing conditions so that, when the trigger is pulled, the image is acquired at a camera setting that is more optimal to the conditions. However, the first exemplary approach disadvantageously delays final acquisition of the decoded image and the second exemplary approach disadvantageously requires that the user maintain the reader in relatively the same location and orientation prior to pulling the trigger. Both of these approaches can reduce (or do not increase) the "snappiness" of the device—that is, the trigger-to-beep time, in which a successful read occurs.

It is therefore desirable to provide a system and method that enables increased snappiness with respect to the recognition and handling (e.g. ID finding and decoding) of features of interest on object in imaged scenes where there can exist great variation between light and other conditions with respect to each of the objects and/or each of the scenes. More generally, it is desirable that the system and method effectively provide for responsive auto-regulation of the device in a varying lighting and/or image-acquisition environments

SUMMARY OF THE INVENTION

This invention overcomes disadvantages of the prior art by providing a system and method for auto-regulation of parameters a vision system camera and/or associated illumination of objects imaged by the camera using a plurality of differentiated gain (multi-gain) settings on the camera's image sensor to determine the gain value producing the most-readable gain image. The gain image (having the best characteristics) acquired using multiple gain settings can be read for information as a discrete gain image (e.g. interleaved into an overall multigrain image or extracted as a subsampled image) and/or the camera parameters (e.g. global gain and/or global exposure time) can be set uniformly across pixels in the array to the best values for acquisition of a subsequent, higher sampled image. This image is then read (e.g. decoded) for information contained within any identified features of interest (e.g. found IDs).

In an illustrative embodiment, a system and method for auto-regulation of settings in a vision system camera acquiring images of scenes containing features of interest (e.g. IDs) is provided. A processor (CPU) receives image data from an image sensor (typically grayscale) having an array of pixels arranged in discrete pixel groups. These pixel groups are each independently adjustable with a respective gain setting. An adjustment process reads the pixel groups and selects at least one acquired gain image associated with at least one of the pixel groups. The selected gain image includes a version of a feature of interest in an imaged scene that allows information to be read therefrom with sufficient detail for the information to be used in a further process (e.g. decoding an ID in the image to generate decoded data).

When acquired, such gain images can reside within one overall interleaved image that represents all or a portion of the available field of view of the sensor. Alternatively, gain images can be extracted from the interleaved image for subsequent analysis of these discrete subsampled images. The adjustment process illustratively changes at least one parameter of the camera based upon a gain value of the pixels associated with the selected gain image, and this parameter is at least one of gain and exposure. Illustratively, the processor can acquire and analyze a further or subsequent image with pixels from a plurality, or all the pixel groups using the reset parameter(s). The parameter(s) is/are reset uniformly across some or all of the pixels in groups that were previously set at different gains so that these pixels are used to acquire the subsequent image. This reset includes a global reset of gain for the pixels and a global reset of exposure time across the pixel array. The processor can be constructed and arranged to (alternatively or additionally) control a characteristic of an illuminator assembly based upon the gain value. Such illumination characteristics can include brightness, angle duration, etc. In an embodiment, each discrete pixel from each of the pixel groups can be organized into each of a plurality of four-pixel (e.g. 2×2) matrices. These matrices are tessellated across the pixel array. Alternatively, the pixel groups can each be organized into each of a plurality of tiles of pixels. The tiles are, likewise, tessellated across the pixel array.

BRIEF DESCRIPTION OF THE DRAWINGS

The invention description below refers to the accompanying drawings, of which.

DETAILED DESCRIPTION

Figure 1:
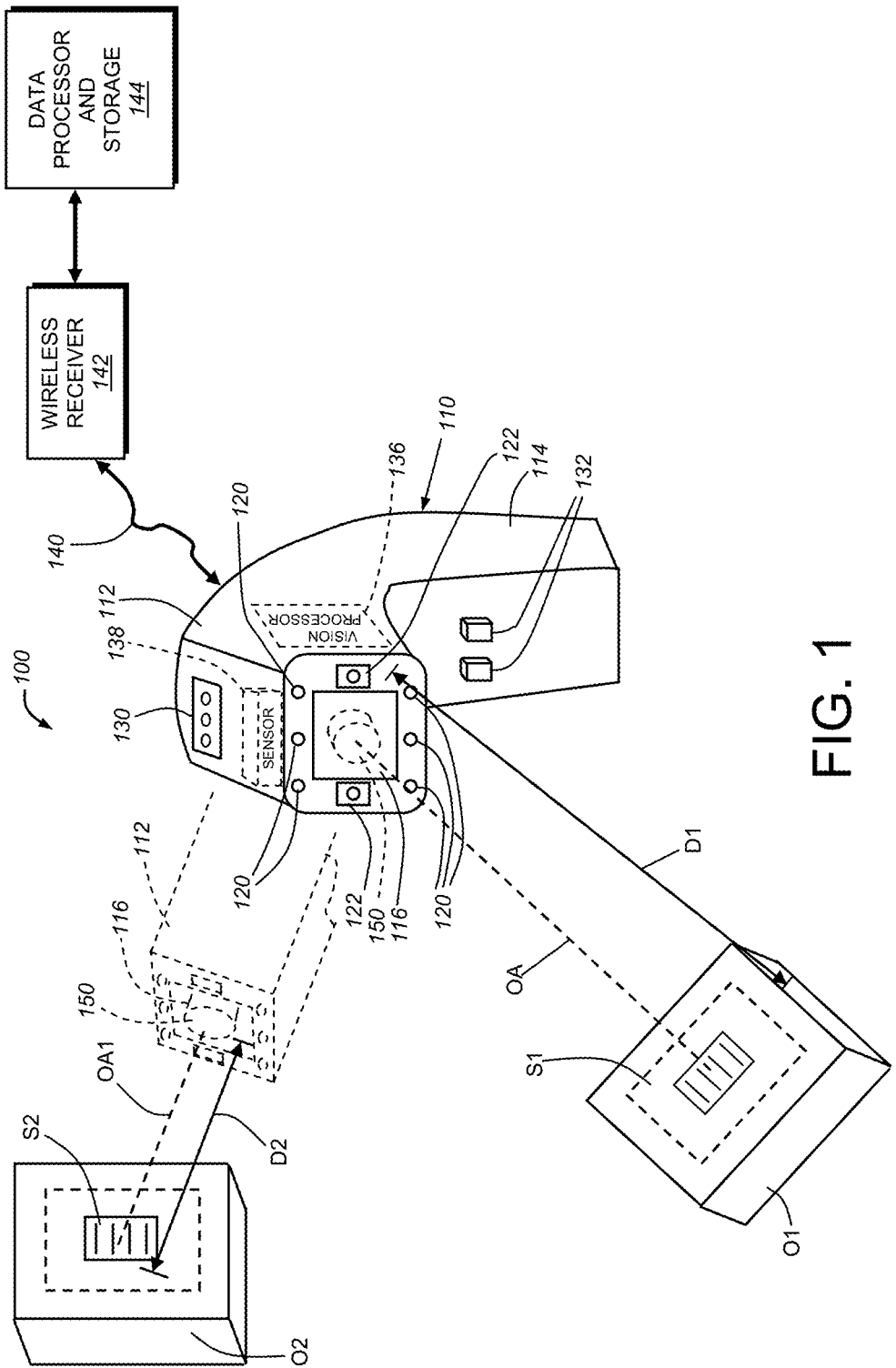
FIG. 1 is a diagram of an exemplary handheld ID reader having an image sensor and vision processor (CPU) configured to carry out auto-regulation functions based upon acquisition of multi-gain images according to an illustrative embodiment, shown acquiring images of objects in respective scenes having different orientations and characteristics.

FIG. 1 shows a vision system 100, which includes at least one ID reader 110 that can be handheld, as shown, or fixed in a position with respect to an imaged scene. The reader can define any acceptable housing, including the depicted main body 112 and grip 114. In this embodiment, the reader includes a front window 116, which is surrounded by an internal illumination system (illuminator). External illumination can optionally be provided in synchronization with operation of the reader. The internal illuminator can comprise any arrangement and/or combination of lighting elements. In this embodiment, and by way of example, discrete light elements (e.g. high-output LEDs) 120, 122 are employed and allow for differing color/wavelength, angle and/or intensity of illumination. The illuminator can include conventional aiming LEDs (not shown) that project a beam onto a field of view to ensure that features of interest (e.g. barcodes or other types of IDs) are properly and fully imaged. The reader 110 can include an indicator and interface panel 130, located at the rear of the body 112 in this embodiment. This panel can include on/off and other switches as well as lights to indicate a "good" or "failed" ID read (i.e. success or failure in reading/decoding the ID). The grip 114 can include one or more trigger buttons 132 that trigger illumination and image capture among other functions, such as toggling of aiming LEDs.

The reader 110 also includes one or more processing circuits, memory and the like, that are collectively shown (in phantom) as a vision processor 136 (also termed herein a CPU) and associated memory arrangement. This processor 136 performs various image processing, and image data handling/storage functions. Illustratively, the processor 136 receives captured image frame data in the form of color or grayscale pixels (among other formats) from the image sensor (also shown in phantom). The processor searches for ID features (or other features of interest) in the image, and then passes appropriate data to a decoding process that generates decoded data from the ID features. This decoded data is stored and/or passed via a communication link (which can be wired, or wireless as shown) 140 to a receiver 142 that is interconnected via a network or other link with a data processing and storage system 144. This system 144 can comprise a conventional server or PC running appropriate applications for handling and storing decoded data transmitted from the reader 110. Such applications and the architecture of the system 144 should be clear to those of skill in the art.

The reader 110 also includes a lens assembly 150 (shown in phantom behind window 116) that can be fixed-focus or auto-focusing. By way of example, an object O1 having an ID S1 is imaged by the reader 110 with the lens 150 focusing upon a field of view FOV1 in which the ID S1 occupies a particular location and orientation with respect to the reader. The focal distance D1 along optical axis OA1 is within an acceptable operating range. Likewise, the reader 110 can be focused (as shown in phantom) on another object O2 located at a differing location and orientation (and focal distance D2) along optical axis OA2. The two exemplary orientations can vary widely in illumination/ambient light characteristics, ID characteristics (e.g. high-contrast, low-contrast, peened, black-on-white, white-on-black, ID size (e.g. 2 mils-20 mils in size), etc.), focal distance, and/or angle of the optical axis with respect to the ID. These factors can all affect the snappiness of the system 100 reading from one ID to another. To the extent that factors such as pixel gain and exposure can be optimized to improve snappiness, the illustrative embodiment is adapted so that the vision processor/CPU 136 and interconnected image sensor 138 operate to select an optimal pixel gain and/or exposure. These parameter settings allow for quicker and more-accurate reading/decoding of IDs or other features of interest.

Figure 2:
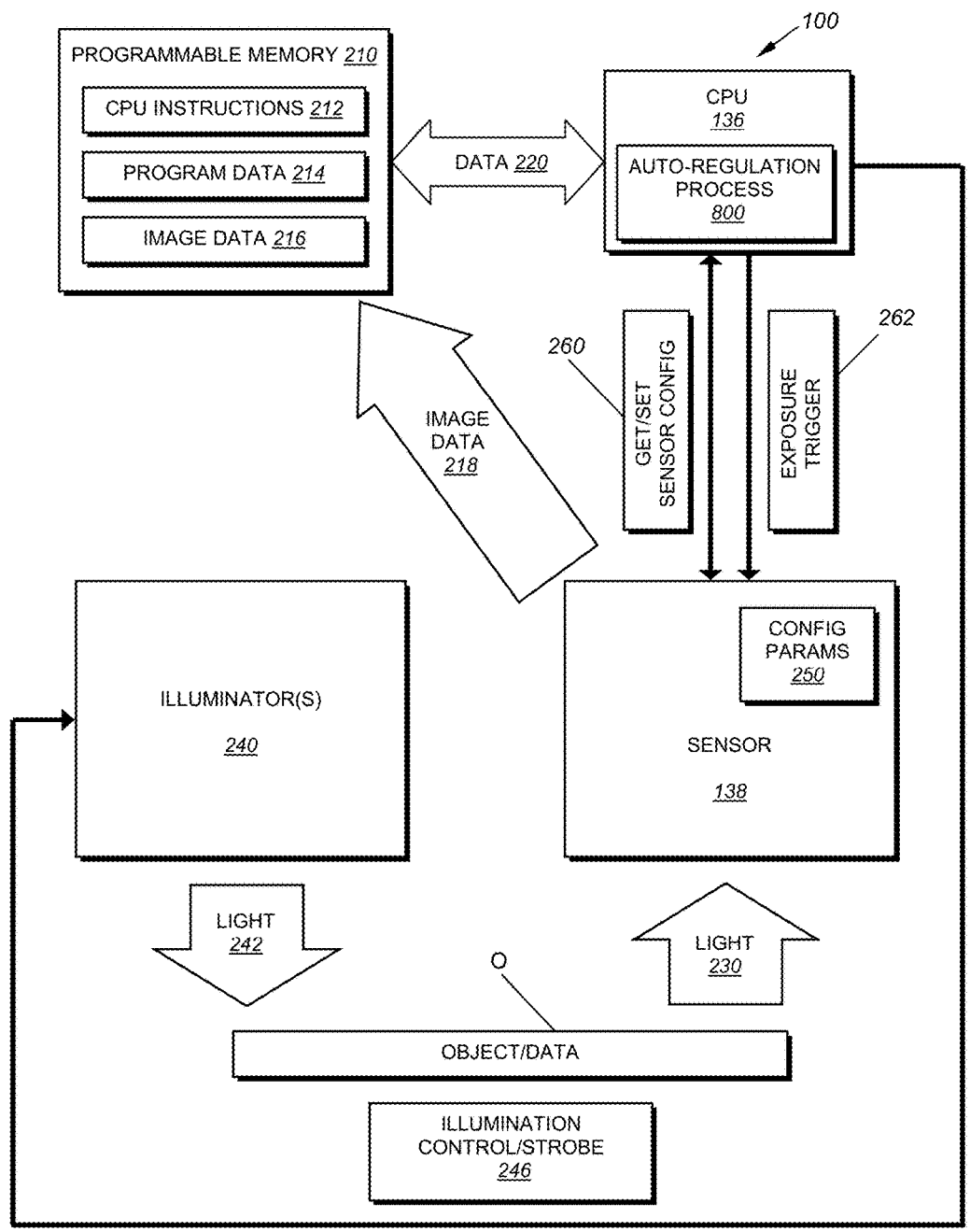
FIG. 2 is a block diagram of the functional components of the ID reader of FIG. 1 showing the arrangement of components and passage of information between components.

With reference to FIG. 2, the system 100 and the interoperation of components therein is shown schematically. As depicted, the CPU is operatively connected with a programmable memory arrangement 210 that can consist of one or more RAMs that store (for example) program data 212, CPU operating instructions 214 and/or image data 216. This data 220 is transferred to and from the CPU 136 via appropriate bus architecture. The sensor 138 transmits image data 218 to the memory 210 based on acquired image frames. The image data represents light 230 reflected from an object O having IDs and/or other features of interest. An internal and/or external illuminator 240 along with any ambient illumination transmits light onto the object O, which is reflected (light 230) in a specific manner toward the sensor 138. The manner in which the light is reflected affects the ability of the sensor to find and decode IDs. Illumination timing, intensity, pattern, type, etc. can be controlled by appropriate strobe signals 246 provided by the CPU 136. This acquired and stored image data 216 is processed as appropriate by the CPU 136. This processing includes use of the image data 216 in various auto-regulation functions in which camera parameters are adjusted (described further below). Such auto-regulation is provided in part by configuration parameters 250 that are set (260) by the CPU 136. Illustratively, such parameters include exposure and gain. According to an illustrative embodiment, the parameters 250 are set based upon images triggered (262) by the CPU and used, at least in part, for auto-regulation processes.

Figure 3:
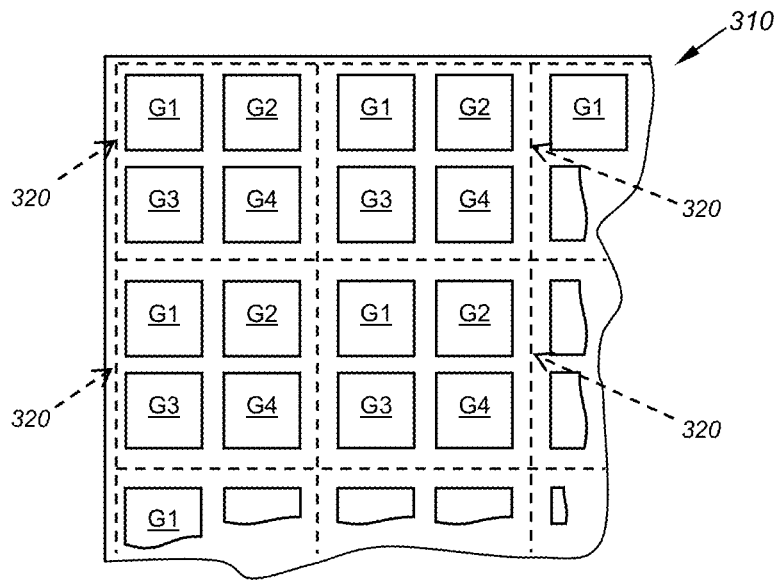
FIG. 3 is a diagram of a portion of an image sensor pixel array containing tessellated groupings of 2×2 multi-gain pixels for use with the system and method of FIG. 1.

It is recognized that a variety of commercially available image sensors contain functionality that enables the gain of individual pixels in a grouping of pixels to be adjusted. More particularly, various commercially available sensors allow for each of four pixels in each 2×2 grouping (across the entire sensor) to be adjusted in order to adjust color sensor response to Red/Green/Blue (RGB) a standard Bayer pattern. That is, where the sensor is capable of sensing color, each pixel is covered with a certain color filter (termed a Bayer filter). The pixels define a tessellated pattern of red, green and blue filters—often where green appears twice in the group of four. Alternatively sensors can employ cyan magenta yellow (CMY), or another set of wavelengths. Such exemplary (CMOS) sensors include, but are not limited to, model MT9M001 available from Micron Technology, Inc. of Boise, Id. and model EV76C560 available from e2v Technologies of the United Kingdom. When the sensor is provided free of any color filter it operates as a grayscale unit. FIG. 3 depicts a portion of an exemplary sensor pixel array 310. Groupings (dashed boxes 320) of four pixels (2×2) are depicted. Each grouping (or matrix) allows for four independent gain values G1, G2, G3 and G4 to be adjusted therein. That is, the location denoted G1 is adjusted in a tessellated manner across the entire pixel array. Likewise, G2, G3 and G4 can each be independently adjusted across the array. All pixels denoted either G1, G2, G3 or G4 carry the same adjusted gain value.

Other sensors allow for the independent adjustment of gain in individual tiles of pixels. For example, the model MT9V034 available from Aptina Imaging Corporation of San Jose, Calif. allows for independent adjustment of a tile of pixels. As shown a series of 5×5 tiles (P5) of 25 pixels can be independently set to a desired gain. By way of example, each tile in the sensor pixel array 410 can be set to one of four gain values G1, G2, G3 and G4, and all pixels in that tile carry the same gain value. The specific gain values in each of the tiles are tessellated across the entire sensor array as shown. In alternate embodiments, fewer or greater than four independently adjustable gain values can be provided to the arrangement of FIG. 3 or FIG. 4.

The adjustment of each gain value G1-G4 across the pixel array (310 or 410) is accomplished in accordance with the specifications provided by the manufacturer of the sensor based upon program instructions and processes carried out in the CPU. As used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

Figure 4:
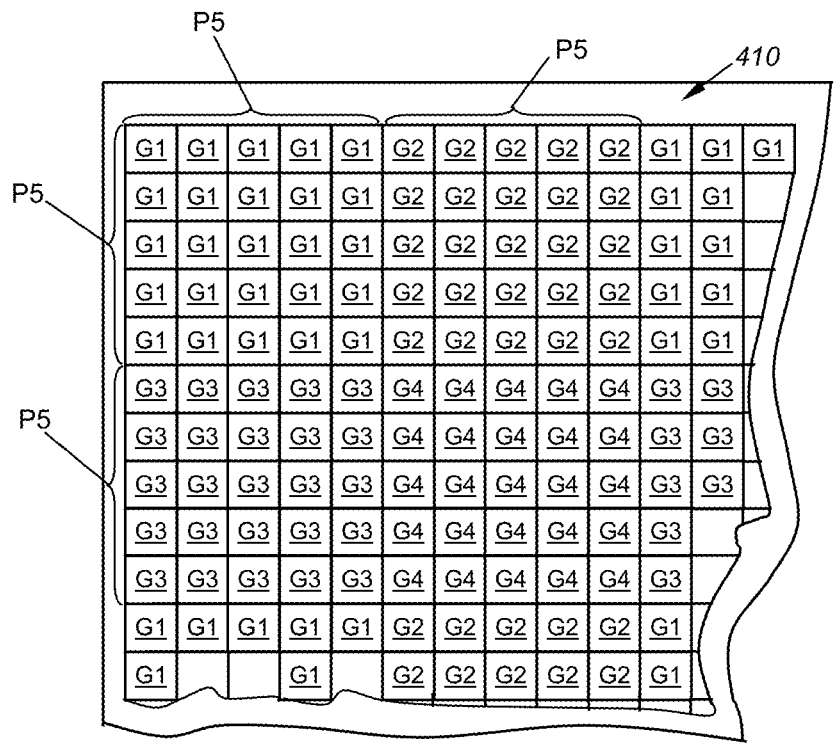
FIG. 4 is a diagram of a portion of an image sensor pixel array containing tessellated tiles of pixels, in which the gain of all pixels in each tile can be independently set, for use with the system and method of FIG. 1.
Figure 5:
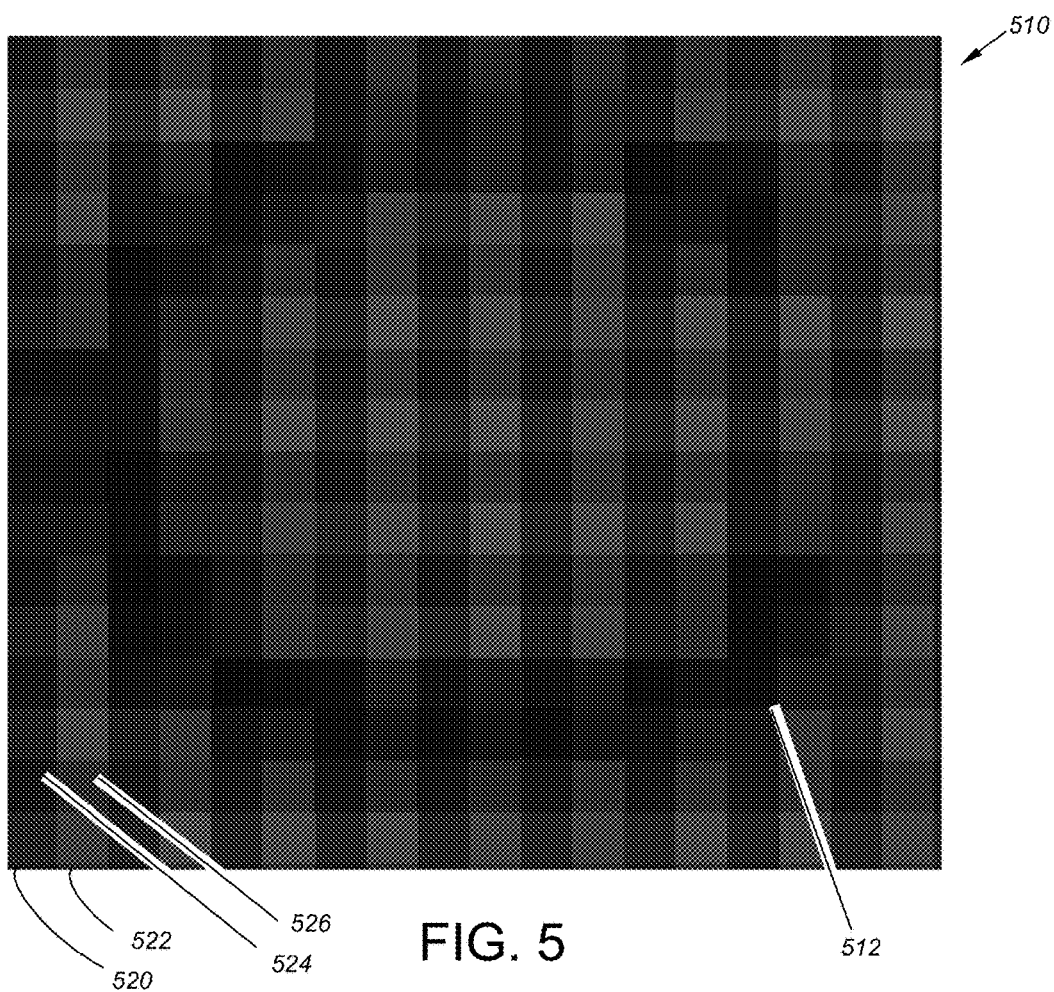
FIG. 5 is a display of an exemplary overall multi-gain image comprising four interleaved gain images produced using the system and method of FIG. 1.
Figure 6:
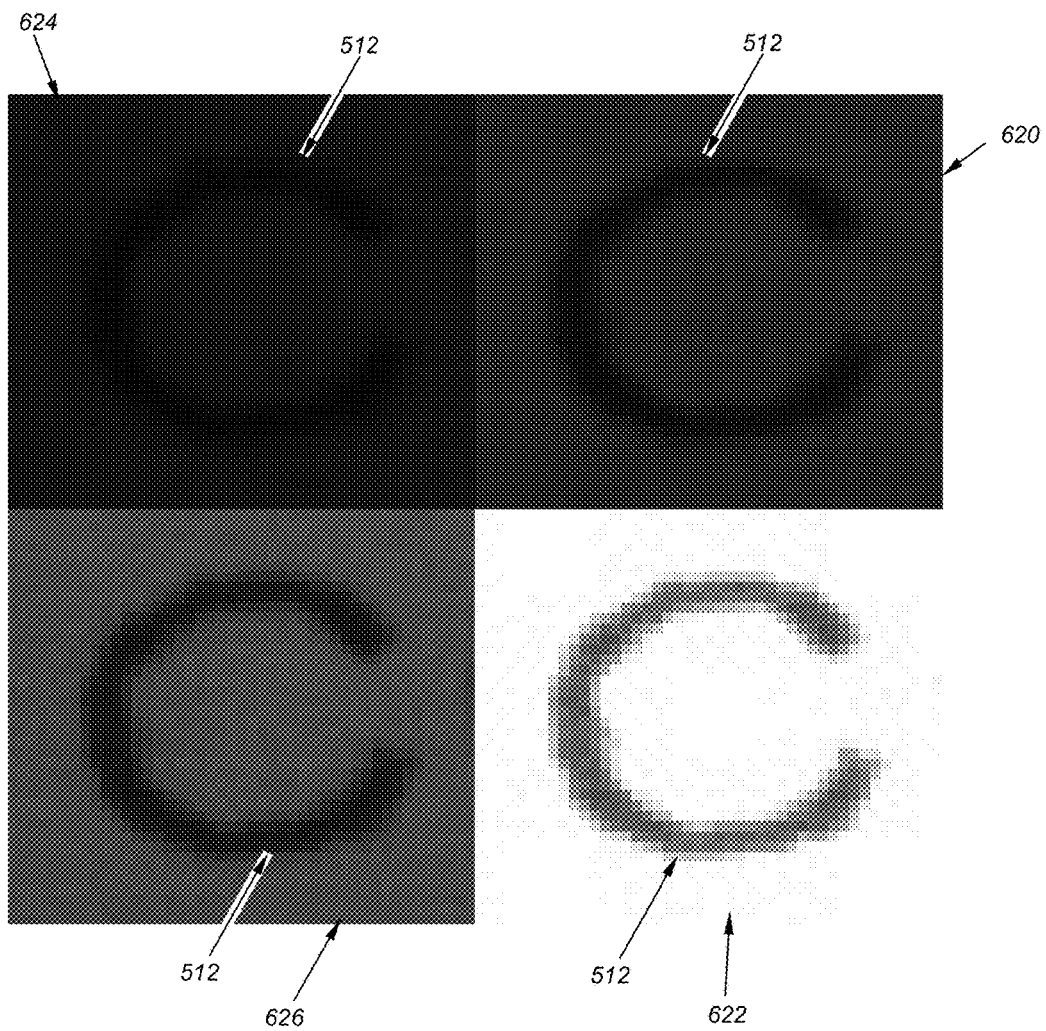
FIG. 6 is a display of four discrete, subsampled gain images extracted from each set of discrete-gain pixels in the multi-gain image of FIG. 5, showing variation between the contrast of a background relative a feature of interest.

By way of non-limiting example, FIG. 5 depicts a "multi-gain" displayed image 510 of an object with a central feature of interest 512. By setting the individual gain of each of four pixel tiles 520, 522, 524 and 526 in the exemplary array (e.g. array 410 in FIG. 4) of pixels (e.g. the array 310 of FIG. 3), the resulting image data appears as a series of lighter or darker regions across the entire image field. This overall image is essentially four interleaved gain images, each with one fourth the total pixel count of the array within the displayed area. As shown in FIG. 6, each of four unique, partial (subsampled) gain images 620, 622, 624 and 626 respectively correspond to all tiles (or pixels) 520, 522, 524 and 526 in the multi-gain image 510. It should be clear that the feature of interest 512 (a dark letter "C") is most clear using the gain setting for pixels 522. Conversely, the feature 512 is practically invisible using the gain of pixels 624. The images 626 and 620 display intermediate visibility for the exemplary feature of interest 512.

Thus, by setting a series of low to high gains, one of the four images 620, 622, 624 and 626 is generally in a range of gray levels in which the pixels are neither washed out (too light) due to over-exposure, or so dark that the image noise is greater than the signal. In illustrative embodiments, the gain image (e.g. subsampled image 622) is sufficient that acceptable information—such as a readable ID can be derived directly from it. In other embodiments, the image whose luminance is closest to the ideal (622) is used as the reference for predicting the best gain and/or exposure for the normal full/high resolution ("resolution" meaning the pitch/frequency of the image) image, which can be acquired in a subsequent image frame after the gain of all pixels is set uniformly to the gain that produces the most-readable image. In the depicted example, gains are set to 1.5, 5, 10, and 15. However, these four gain values are exemplary of a wide range of possible values that can be applied to discrete groups of independently settable pixels.

Figure 7:
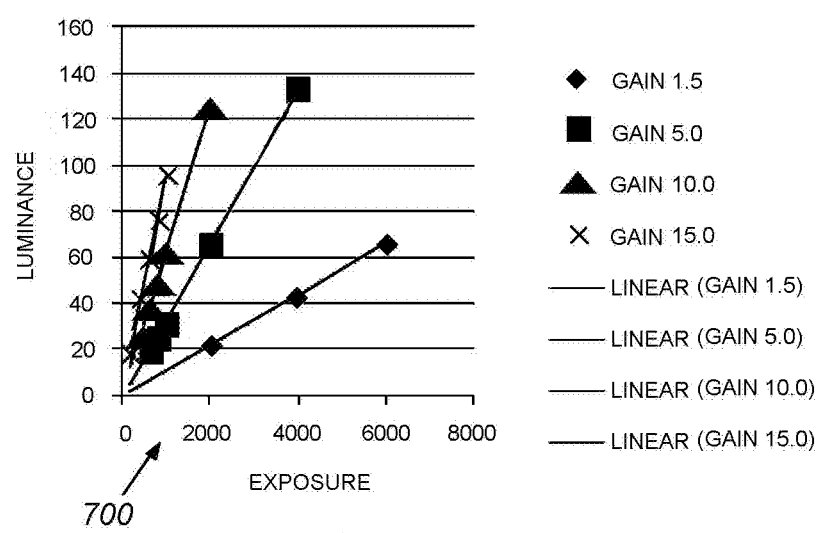
FIG. 7 is a graph showing a plot of luminance versus exposure for each of the four discrete gain settings used to produce the multi-gain image of FIG. 5.

Reference is made to FIG. 7, which depicts a graph 700 of Exposure (microseconds) versus Luminance ($cd/M^2$) for each of the four above-described, exemplary gain values based upon measurements using the above-described sensor arrangement (FIG. 4). Only the luminance values that are less than 150 are plotted, in order to avoid the non-linear plateau caused by over-exposure, we get nice linear data for each gain as seen in the first chart below left. As shown, each graph line is substantially linear across the range of values plotted. This predictability assists in determining the correct gain setting, particularly for images that exhibit optimal characteristics between two of the gain settings.

Figure 8:
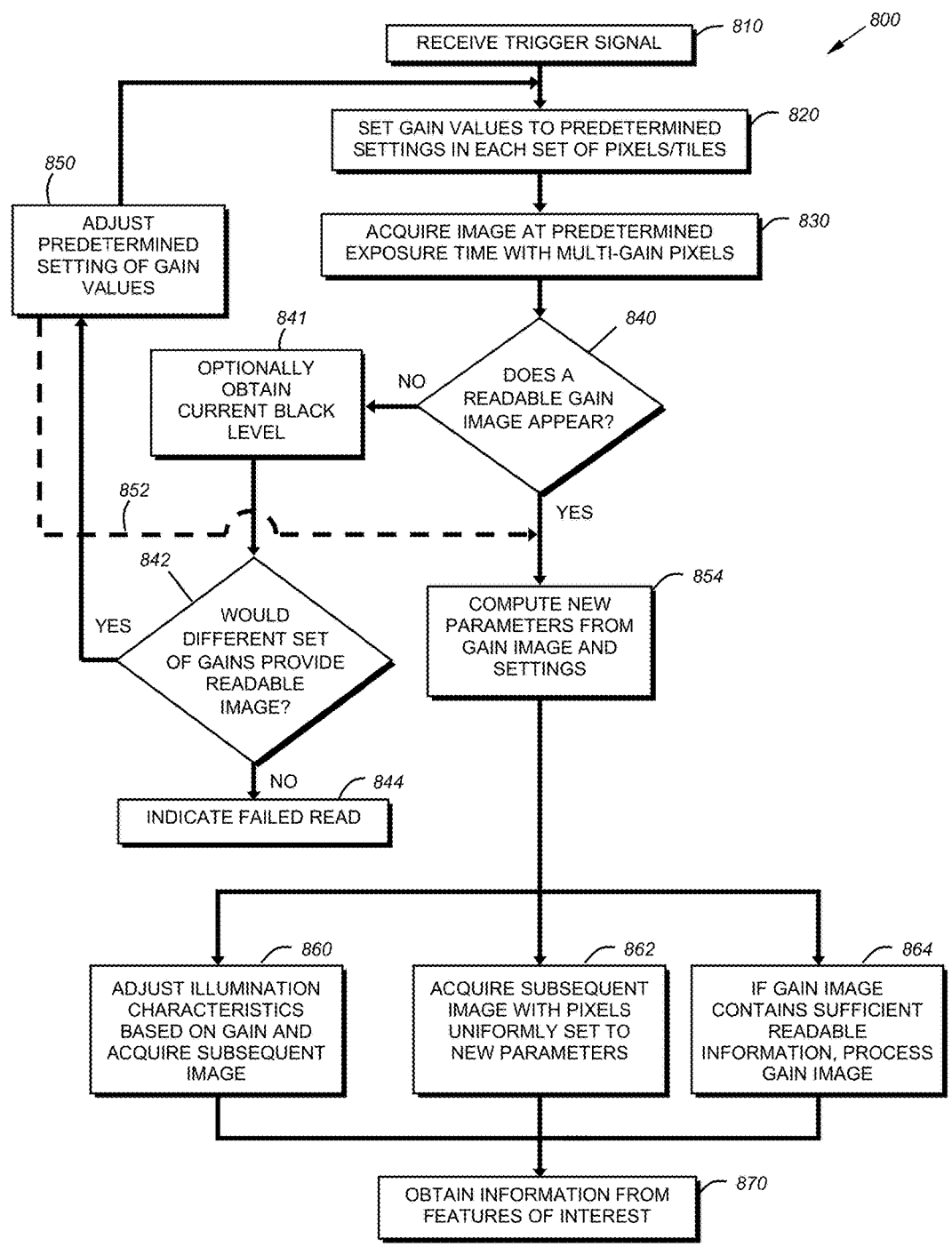
FIG. 8 is a flow diagram of a procedure for setting multi-gain pixels/tiles and determining a desirable illumination, gain and/or exposure for the image sensor for use in acquiring a subsequent image of a scene with uniformly reset parameters.

FIG. 8 is a flow diagram of a procedure 800 for determining an appropriate gain setting for the pixels of the image sensor to obtain a readable image, and adjusting gain and/or exposure settings to subsequently acquire a sufficiently high quality version of the image to obtain information (e.g. decoded ID data) therefrom. The procedure 800 begins when the user or another automated process (e.g. an assembly line encoder and/or object detection process) transmits a trigger signal, requesting image acquisition (step 810). In step 820, each of a plurality of gain settings are applied to each respective set of pixels or pixel tiles across the image sensor. These values can be selected initially and in any subsequent iterations of the process (described below) using a variety of techniques. In a general technique, the values are set across a wide range of available gain settings as described above.

Notably, the speed of acquisition of the multi-gain image is increased by applying a minimum exposure time in conjunction with a full range of gain settings. At this minimum exposure time a higher gain setting is more likely to provide an acceptable image for the purpose of determining and setting optimal camera parameters. That is, if a lower gain would provide an acceptable image at a longer exposure time, but not at the chosen shortened time, a higher gain setting in one of the gain images provides the desirable image quality at the shorter time. The tradeoff is a high signal to noise ratio (SNR) in the shorter-exposure, higher-gain image. However, for the purpose of determining the best set of camera parameters from the gain image for use in acquiring a normal, longer exposure image (described below), a higher noise content in the gain image does not typically affect the analysis. In an embodiment, the exposure time for acquiring the multi-gain image can be approximately 1000 microseconds (1 millisecond).

Note, as described further below, that in extrapolating the parameters for acquiring a next image, the processor attempts continually to calibrate the black levels on the sensor. This can shift the pixel values by several steps and cause discrepancies between images and between neighboring pixels, since there are four different black level settings for each of the four pixels in the 2×2 multi-gain pixel matrix or tiles. Since the black level correction is typically applied before the Analog to Digital Conversion in readout of the sensor, the values for the correction are typically valued as a voltage reading, and not digital pixel intensity levels (e.g. 0-255), so a correction, is applied to convert the prevailing sensed voltage into a pixel offset. This conversion is set at 50%, based on empirical measurements. The use of black level calibration values generally makes it possible to predict exposures that produce luminance values closer to the desired target, even over large exposure changes.

Based upon the settings, in step 830, the sensor then acquires the image of a scene over a predetermined exposure time and transmits the image data to the CPU. The CPU and associated auto-regulation process (800) then determines (decision step 840) whether one or more of the resulting discrete gain images is sufficiently readable by system processes to resolve information in features of interest, or more generally one or more of the images contains contrast and other characteristics that render it sufficient to obtain information (e.g. decoded ID data). If each gain image is insufficient, then the CPU can determine whether any change in gain would improve the image quality (decision step 842). At (or about) this time, the procedure 800 can obtain the current black level reading from the sensor (step 841). This assists in determining if it should be further adjusted. If the image is basically unreadable, even with four different gain settings, then the decision step 842 directs the system to indicate a failed read (step 844). If an improvement in reading is possible with different gain settings, then, (optionally) the decision step 842 branches to step 850 and a new set of gains is selected to be used in the acquisition of a subsequent multi-gain image in step 820. These new gains can be determined by providing a series of intermediate gain settings between those of one or more pairs of gain images that appear to show possibly readable images. Alternatively a second set of pre-defined (non-dependent on the images of the first set) gain values can be employed—for example, if none of the first set of gain values provides a promising image. A variety of other techniques can be employed for selecting new gain values in step 850. The number of iterations in which gain is changed and readjusted is highly variable. Likewise, it is expressly contemplated that the initial adjustment of gain can form the basis of a set of gain images that are then used in other types of adjustment processes (other than iterative gain readjustment), with the goal of eventually adjusting camera parameters (and/or illumination characteristics) to attain a more-readable image.

Note that it is contemplated that the multi-gain image need not be analyzed over the entire sensor array, but over a reduced portion (and/or reduced field of view) from a predetermined region (e.g. the central region), or a portion that likely contains a feature, or a portion that is otherwise indicative of the general pattern or patterns residing in the image. This focus on a region typically decreases processing time.

When a new multi-gain image is acquired and analyzed via steps 830 and 840, the procedure 800 then uses the gain settings in step 854 to compute new camera parameters (e.g. global gain and global exposure) to apply uniformly over some or all of the pixels in the sensor) for use in the acquisition of a subsequent image. The computation of new parameters can be carried out using a variety of techniques that can rely, for example on look-up tables and/or equations. These computations can rely in part on experimental data, such as, for example, that shown in the graph of FIG. 7.

Note also that if the new gain settings generated in step 850 are for a gain image already deemed to be readable (but possibly below a threshold), the procedure 800 can branch (via dashed-line branch 852 in procedure 800) to step 854, and use at least one of the new settings to further refine parameters in acquiring a subsequent image.

Once the gain image is considered readable and any new parameters have been computed, the procedure can provide that result to at least one of steps 860, 862 and/or 864 or to decision step 842. More generally, the procedure 800 can include a maximum number of iterations (e.g. one iteration of step 850) until the system indicates a failed read (step 844) or transmits parameters and/or the best gain image to steps 860, 862 and/or 864. These steps can be employed in combinations or in various alternatives (or in alternate embodiments). In step 860, the procedure 800 directs the system to vary the intensity, pattern and/or type of illumination and acquire a subsequent image with this new illumination characteristic (and new uniformly set sensor parameters. The illumination characteristics can be based on a lookup or other computation that compares the gain and/or exposure with the best image to an associated illumination parameters can be part of the computation made in step 854. Some or all of this information can be generated using trial and error approaches that generate a table of values, or by empirical formulas. Alternatively (or in addition to step 860), the procedure 800 can use the gain information to reset the global gain and/or exposure of the sensor to acquire a subsequent image using uniformly set pixels across the sensor array. This subsequent image is more likely to be readable. In general, the pixels used to acquire other gain images are reset to a new global gain setting, and a longer exposure time is employed in acquiring this subsequent image. A further alternative is that the acquired gain image can be processed directly (step 864) if its features provide sufficient detail to derive desired information (e.g. a decodable ID). The parameter-computation step 854 can be optional in such instances.

The processing of the acquired image from at least one of steps 860, 862 and 864 occurs at step 870 in which information in the image is read, decoded, or otherwise analyzed, to generate desired data (e.g. an alphanumeric and/or other data stream).

It has been experimentally observed that a multi-gain image (e.g. FIG. 5) with a reduced field of view and subsampling can be acquired in one tenth the time of a normal image (4 ms versus 40 ms), and it can predict an acceptable gain/exposure for the subsequent image from both dark and bright ambient conditions.

It should be clear that the above-described system and method for auto-regulation of parameters of a vision system camera provides a relatively fast and accurate technique for adjusting gain and exposure to account for widely varying conditions between each runtime image acquisition event. This system and method employs features inherent on certain sensors and can be implemented with a minimum of added software code and/or hardware. This system and method also allows for the use of gain images (interleaved and/or extracted, subsampled images) to obtain information or iterative refinement of the camera configuration parameters as appropriate to obtain the desired image quality for successful reading of image feature information.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, it is expressly contemplated that the image sensor used herein can be any acceptable model or type, generally including the ability to differentiate the gain or other similar setting in individual pixels or groups of pixels. Additionally, the processor arrangements used herein are only exemplary of a variety of processor arrangements that can be internal and/or external to the reader. In alternate embodiments, the CPU can be all, or in part, located external to the reader housing with image data transferred over a link to the CPU for processing. Also, while the illustrative embodiment is exemplified by an ID reader (handheld or fixed-mount), it is expressly contemplated that other types of vision systems that operate in wide dynamic ranges can benefit by the teachings herein, including robotic manipulators and surveillance systems (e.g. systems with facial recognition). Accordingly, this description is meant to be taken only by way of example, and not to otherwise limit the scope of this invention.

What is claimed is:

1. A system for auto-regulation of settings in a vision system camera acquiring images of scenes containing features of interest comprising:

a processor that receives image data from at least a portion of an image sensor having an array of pixels arranged in discrete pixel groups that are each independently adjustable with a respective gain setting, wherein each discrete pixel from each of the pixel groups is organized into each of a plurality of four-pixel matrices defining a Bayer pattern, the matrices being tessellated across the pixel array; and an adjustment process that reads the pixel groups and selects at least one acquired gain image associated with at least one of the pixel groups, the selected gain image including a version of a feature of interest in an imaged scene that allows information to be read therefrom.

2. The system as set forth in claim 1 wherein the adjustment process changes at least one parameter of the camera applied uniformly to the array of pixels based upon a gain value of the pixels associated with the selected gain image.

3. The system as set forth in claim 2 wherein the parameter is at least one of a global gain setting and a global exposure setting.

4. The system as set forth in claim 2 wherein the processor is constructed and arranged to acquire and analyze a further image with pixels from a plurality of the pixel groups.

5. The system as set forth in claim 2 wherein the processor is constructed and arranged to control a characteristic of an illuminator assembly based upon the gain value.

6. The system as set forth in claim 1 wherein the pixel groups are each organized into each of a plurality of tiles of pixels, the tiles being tessellated across the pixel array.

7. The system as set forth in claim 1 wherein the processor is constructed and arranged to read the information from the feature of interest on the selected gain image.

8. The system as set forth in claim 1 wherein the feature of interest is an ID and the processor includes an ID decoding process.

9. The system as set forth in claim 1 wherein the gain image is acquired at a minimal exposure time.

10. The system as set forth in claim 1 wherein the gain image is acquired using an exposure time of approximately 1 millisecond.

11. The system as set forth in claim 1, wherein the selected gain image is decoded to identify ID information.

12. A method of acquiring images, comprising:

receiving image data from at least a portion of an image sensor having an array of pixels arranged in discrete pixel groups that are each independently adjustable with a respective gain setting, wherein each discrete pixel from each of the pixel groups is organized into each of a plurality of four-pixel matrices defining a Bayer pattern, the matrices being tessellated across the pixel array;

varying the respective gain settings of pixels within each of the discrete pixel groups;

acquiring a multi-gain image;

analyzing the multi-gain image to determine a second gain setting for the image sensor; and receiving second image data from at least a portion of the image sensor using the second gain setting.

13. The method of claim 12, wherein the multi-gain image comprises four distinct regions corresponding to four distinct respective gain settings.

14. The method of claim 12, wherein the multi-gain image comprises four interleaved gain images.

15. The method of claim 12, wherein determining the second gain setting comprises identifying a region in the multi-gain image comprising readable ID information.

16. The method of claim 15, wherein an exposure time for acquiring the multi-gain image is approximately 1 milliseconds.

17. The method of claim 12, further comprising decoding the second image data to identify ID information.

* * * * *